Dec. 7, 1965  SHINJIRO IZUMI  3,221,910
BOTTLE-FEEDING APPARATUS
Filed May 31, 1963  5 Sheets-Sheet 1

INVENTOR.
SHINJIRO IZUMI

Dec. 7, 1965  SHINJIRO IZUMI  3,221,910
BOTTLE-FEEDING APPARATUS
Filed May 31, 1963  5 Sheets-Sheet 3

INVENTOR.
SHINJIRO IZUMI
BY
ATTORNEYS

Dec. 7, 1965  SHINJIRO IZUMI  3,221,910
BOTTLE-FEEDING APPARATUS
Filed May 31, 1963  5 Sheets-Sheet 4

INVENTOR.
SHINJIRO IZUMI
BY McGrew and Toren
ATTORNEYS 3,221,910
BOTTLE-FEEDING APPARATUS
Shinjiro Izumi, 1336 Ryoke, Urawa-shi, Japan
Filed May 31, 1963, Ser. No. 284,687
Claims priority, application Japan, June 2, 1962,
37/22,651
6 Claims. (Cl. 214—309)

The present invention relates to a bottle-feeding apparatus which may be used in various processes, such as bottle washing, bottle packaging, or the like.

Known bottle-feeding apparatus is usually provided with an air suction or vacuum means including suction nozzles for engaging and picking up bottles to carry the latter to desired positions. Apparatus of this type is not only complicated and bulky, but also requires a large quantity of energy for operation of the air suction nozzles. Furthermore, due to the large number of suction nozzles used in the apparatus, the operating expense is high. Consequently, economical operation of the apparatus is substantially impossible.

Additionally, in known bottle feeding apparatus, some foreign matter remains in or is deposited in the bottle. This may result in clogging of the air suction or vacuum lines, so that a smooth operation of the bottle-feeding apparatus is impaired.

An object of the present invention is to provide a simple, reliable and efficient bottle-feeding apparatus which does not require an air-suction means such as used in a conventional bottle-feeding apparatus and is capable of conveying each bottle to a desired position by sticking a suction cup made of an elastic material such as rubber, to the inner bottom surface of each bottle, such suction cup being manufactured at low cost and operated without trouble.

Another object of the present invention is to provide a simple and reliable bottle-feeding apparatus in which feeding of the bottle into a predetermined position, picking up of the thus feed bottle, guiding the picked up bottle, separating of the picked up bottle from the suction cup and finally conveying of the separated bottle to a desired position is carried out in a preselected order.

The apparatus according to the present invention may be used for the feeding of bottles for various purposes, such as, for instance, as a bottle feeder for a bottle-washing apparatus or the like.

Bottle-feeding apparatus according to the present invention is characterized by comprising a conveyor for conveying a plurality of emptied bottles, arranged in upright position, a plurality of resilient suction cups insertable into engagement with the inner surface of the bottom of each of said bottles, means for inserting said suction cups into the bottles and moving the suction cup with the bottles, restricting means to restrict the movement of the bottles thereby to separate the bottles from the suction cups, and a conveyor for conveying the separated bottles to a desired position.

In the bottle-feeding apparatus of the present invention, when foreign matter, which cannot be washed out in a bottle washing machine, remains in or is deposited on the inner surface of the bottom of any bottle, this foreign matter prevents the suction cup from sticking to the inner surface of the bottom of the bottle. Therefore, such a bottle is not picked up by the suction cup, which facilitates an operator inspecting the bottles in which foreign matter is present.

The features of the present invention will become more apparent from the following description with reference to the accompanying drawing showing embodiments of the bottle-feeding apparatus according to the present invention, and wherein.

Figure 3:
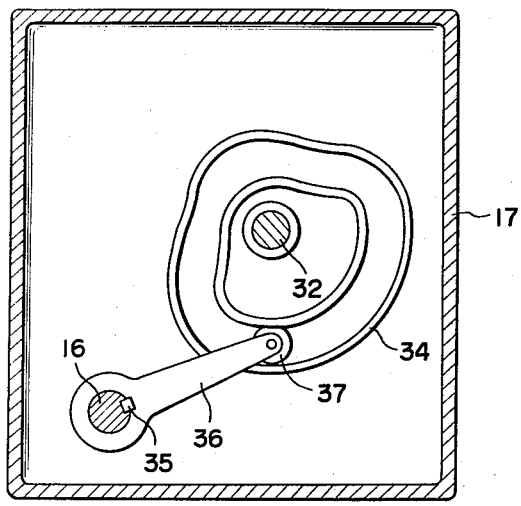
FIG. 3 is a sectional view along line III—III in FIG. 2.
Figure 4:
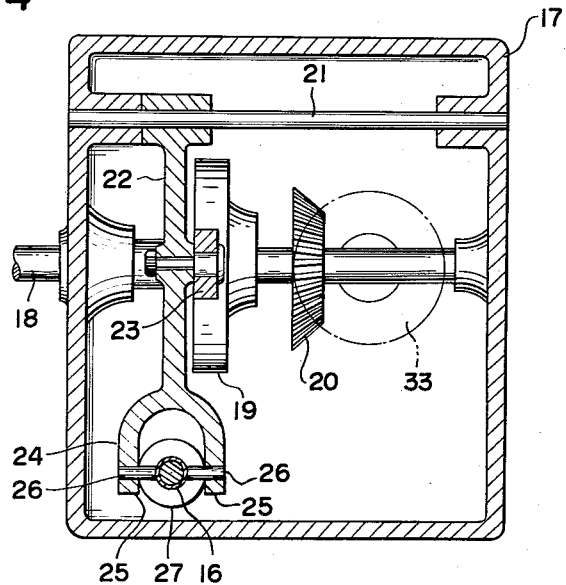
FIG. 4 is a sectional view along line IV—IV in FIG. 2.
Figure 5:
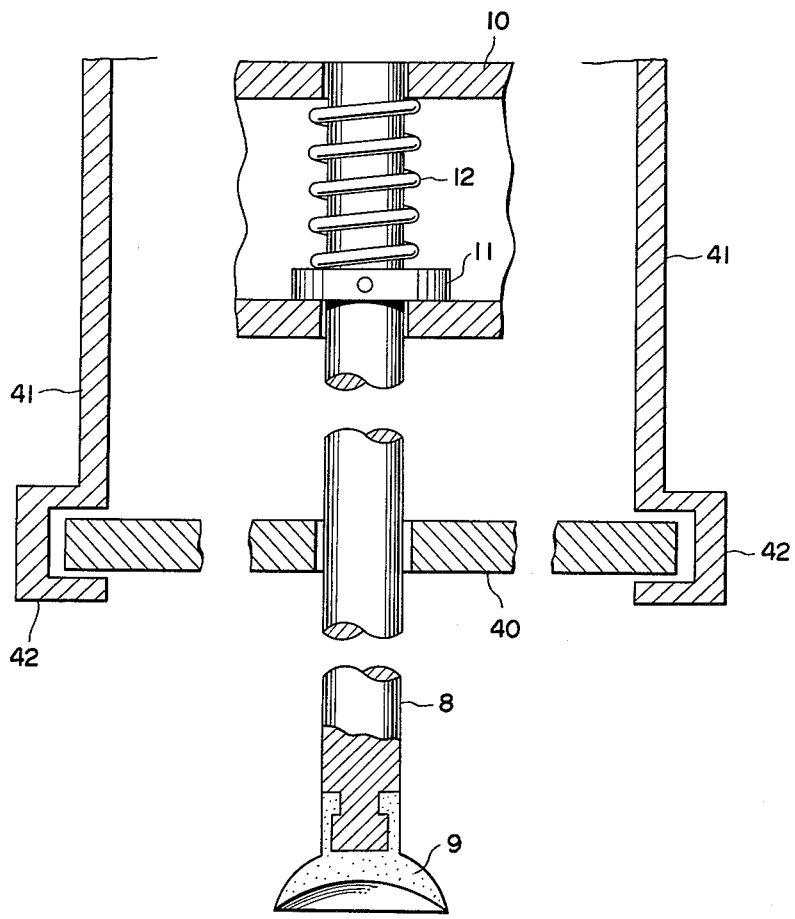
FIG. 5 is an enlarged view of a suction cup and a holder therefor.
Figure 6:
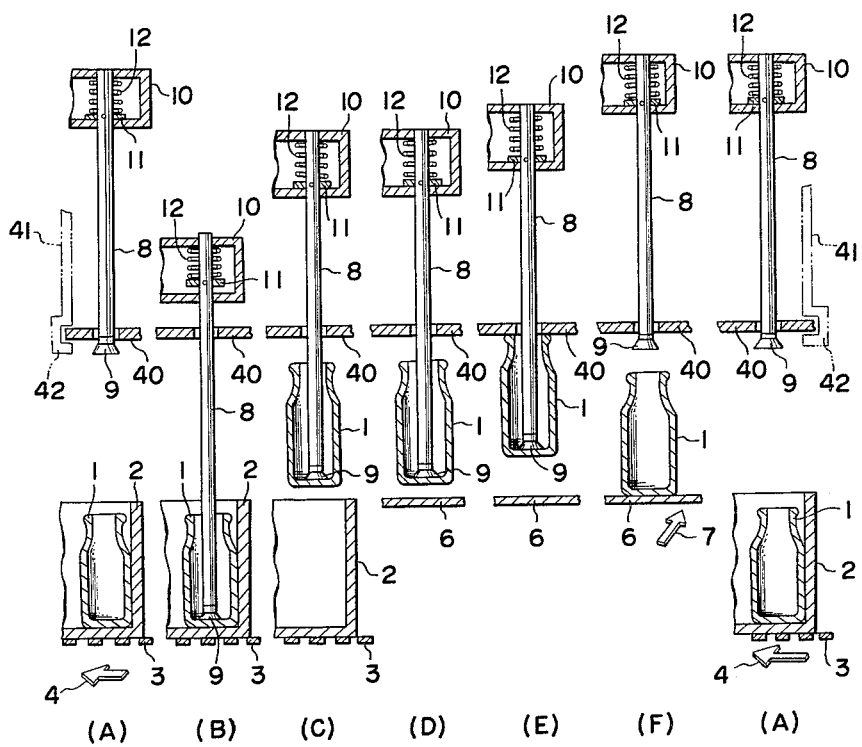
Figure 7:
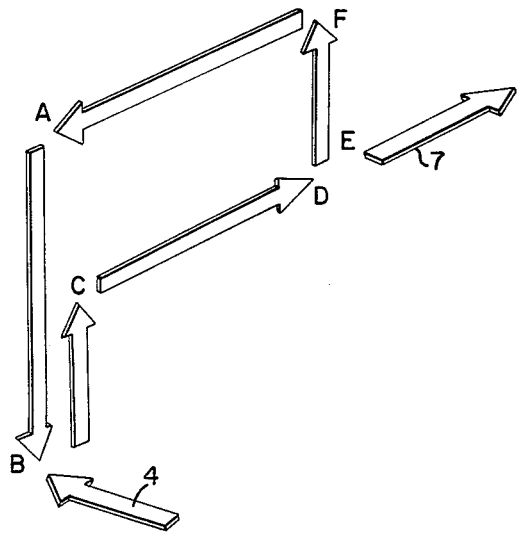

FIG. 6 is an illustrative view showing in sequence the movement of a bottle, and FIG. 7 is an illustrative view showing the paths of the suction cup and the bottle by arrows, Referring to FIGS. 1 through 8, emptied bottles 1, which are to be conveyed to a bottle washing machine which has not been illustrated, are positioned upright at uniformly spaced positions, in a predetermined pattern, in a box 2. Box 2 is placed on a conveyor 3 which moves the box in the direction of the arrow 4 until the box strikes an abutment 5, extending perpendicularly across conveyor 3 at a transfer station. A second conveyor 6, positioned with its upper surface substantially flush with the upper edge of box 2 or with the mouth ends of the bottles in the box 2, extends at right angles to conveyor 3 in alignment with box 2 when the latter is in engagement with abutment 5. A plurality of vertically reciprocable supporting rods 8, arranged in the same predetermined pattern as bottles 1, are provided for transferring bottles 1 from box 2 to conveyor 6. Each of these rods is provided, at its lower end, with an inperforate suction cup 9 made of an elastic material such as rubber. FIG. 5 illustrates the rods 8 and the suction cups 9 on a larger scale. The upper end of each rod 8 is provided with a collar 11. Each collar 11 under the action of a spring 12 rests on the inside face of a hollow supporting-box 10 preventing the associated rod 8 from falling from said box, but the associated rod 8 may be slightly raised.

A shaft 13 fixed on the upper surface of the supporting-box 10 is inserted through a slot 15 formed adjacent one end of a swing arm 14, and is fixed on said arm by upper and lower collars $C_1$ and $C_2$. The other end of the arm 14 is fixed to a vertical shaft 16 which is rotatable and vertically reciprocable through a housing 17.

Figure 2:
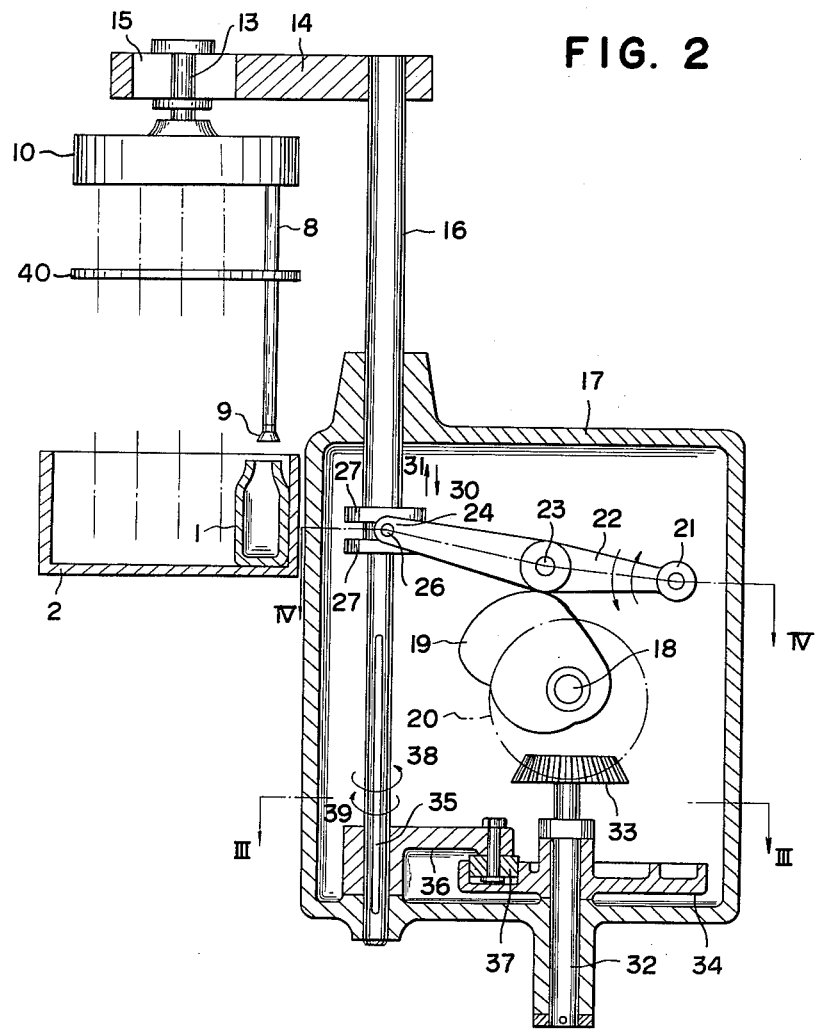
FIG. 2 is a sectional view along line II—II in FIG. 1.

The movement of the shaft 16 through the housing 17 will be explained below, with reference to FIGS. 2, 3 and 4. A cam 19 and a bevel gear 20 are fixed to a shaft 18. Although shaft 18 is illustrated as the driving shaft for conveyor 6, shaft 18 may be separately driven. One end of a movable arm 22 is pivoted to a shaft 21 supported in the housing 17 while the other end of said arm 20 is formed as a fork 24, to which two sliders 25, 25, opposed to each other, are rotatably attached by pins 26, 26, as shown in FIG. 4. A roller 23 supported by the arm 22 cooperates with the cam 19 to cause swing motion of said arm. This motion is transmitted through the sliders 25, 25 to the shaft 16, as shown by arrows 30, 31, in FIG. 2 because these sliders are inserted between two collars 27, 27 fixed to said shaft.

Bevel gear 20, meshes with another bevel gear 33 fixed to a vertical shaft 32. The shaft 32, extending through the bottom of the housing 17, is provided with a grooved cam 34, with which is engaged is a roller 37. Roller 37 is fixed to the end of an arm 36 which is keyed by a key 35 to the lower part of the shaft 16. The rotation of the cam 34 therefore causes the arm 36 to swing, so that the shaft 16 may be turned, as shown by arrows 38, 39 in FIG. 2.

Figure 1:
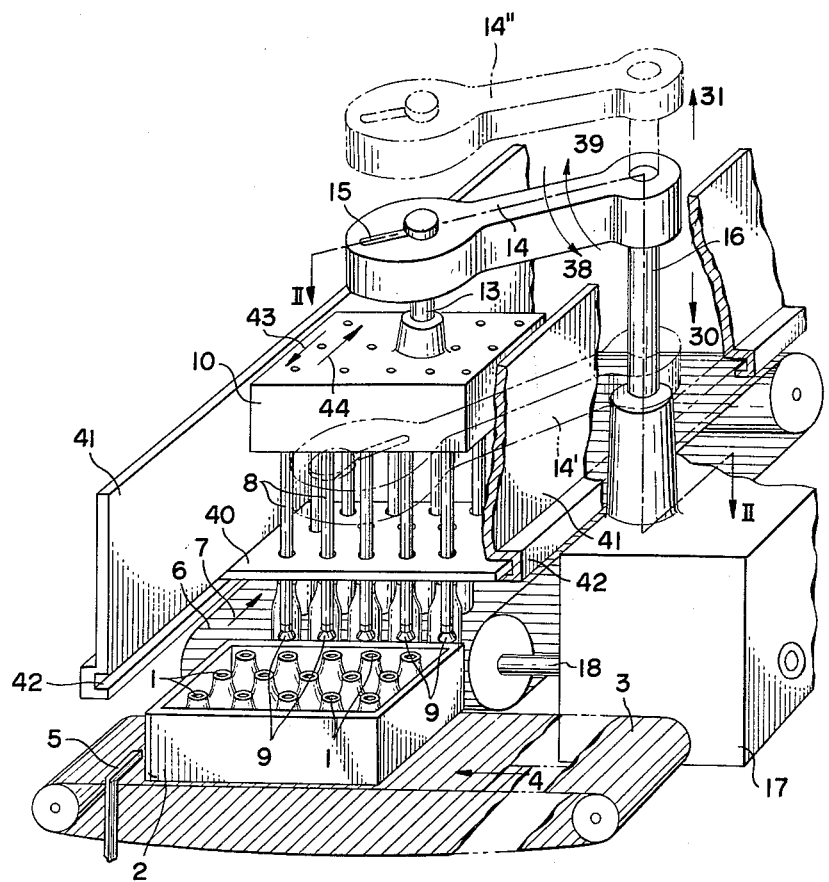
FIG. 1 is a perspective view partly in section, of one embodiment of apparatus in accordance with the invention.

In order to separate a suction cup 9 from a bottle 1 by restricting the movement of each bottle 1, a restricting-plate 40 is provided, as shown in FIGS. 1 and 5.

The restricting-plate 40, through which supporting-rods 8 extend, is arranged in such a way that its side edges engaged with grooves 42 on guide-frames 41 fixed, in parallel with each other and with conveyor 6, to the frame (not shown) of the apparatus. These guide-frames extend over the conveyor 3.

Swinging motion of the arm 14 caused by the turning shaft 16 causes the supporting-box 10 to be reciprocated parallel to conveyor 6, as shown by arrows 43, 44 (FIG. 1). Besides, by raising the shaft 16, suction cups 9 may be detached from bottle 1 on the upper ends of the bottles strike the restricting-plate 40 (FIG. 6).

The function of the apparatus will be explained as follows in accordance with the sequence of movement of each bottle 1:

(a) As shown in FIG. 7, bottles 1, arranged in box 2 and fed in the direction of an arrow 4, come to a standstill when box 2 engages with abutment 5. This is illustrated in (A) shown in FIGS. 6 and 7, in which the shaft 16 is at its highest position.

(b) The shaft 16 is lowered without turning, as illustrated in (B) shown in FIG. 6, accompanied with the sticking of a suction cup 9 to the inside surface of the bottom of each bottle 1. The position of the sucker is indicated by (B) shown in FIG. 7. Then the arm 14 and the box 10 come to a position 14′, shown in FIG. 1.

(c) The shaft 16 is raised without turning until the bottom of each bottle 1 becomes a little higher than the box 2 (according to the shapes of the cam 19 and the grooved cam 34), as illustrated in (C) shown in FIG. 6. Then the suction cup 9 is positioned at (C) shown in FIG. 7, and the arm is level with the solid line position shown in FIG. 1.

(d) The shaft 16 is turned, without lifting, in the direction of an arrow 39, until the arm 14 occupies the position shown in full lines in FIG. 1. As a result, bottles 1 are shifted over the conveyor 6, as illustrated in (D) shown in FIG. 6, the sucker lying at (D) shown in FIG. 7.

(e) The shaft 16 is then raised, without turning, until the arm 14 occupies a position 14″ shown in FIG. 1. Soon after the beginning of this raising, the upper open end of each bottle 1 strikes the restricting-plate 40 which restricts the further movement of said bottle, as illustrated in (E) shown in FIG. 6. The suction cups 9, however, being moved upwardly, are withdrawn from bottles 1 which fall down onto the conveyor 6, as illustrated in (F) shown in FIG. 6. Bottles 1 on the conveyor 6 are fed in the direction of an arrow 7 shown in FIG. 7. Then the suction cups 9 are positioned at (F) shown in FIG. 7.

(f) Finally, the shaft 16 is turned without vertical movement, in the direction of an arrow 38, back to the initial position. As a result, the arm 14 is also back to the initial position described above, the suction cup 9 lying at (A) shown in FIG. 7.

It will be understood that both cam 19 and cam 34 are designed in such a manner as to effect properly the movements described above.

I claim:

1. Bottle-feeding apparatus comprising, in combination, a first conveyor means arranged to transport a plurality of upright emptied bottles, arranged in a predetermined pattern, to a transfer station; a second conveyor means extending from said transfer station and arranged to have the bottles on said first conveyor means transferred thereto; a plurality of vertically reciprocable rods at said transfer station, equal in number to said bottles and arranged in said predetermined pattern; a plurality of suction cups each secured to the lower end of a respective rod; means mounting said rods for reciprocation in unison to project into bottles at said transfer station to engage said suction cups with the inner surfaces of the bottle bottoms, and to lift said bottles to a first preselected level above said first conveyor means; means for moving said mounting means horizontally to transfer said rods between a first position, vertically aligned with said first conveyor means, and a second position, vertically aligned with said second conveyor means; means operable, when said mounting means is in said second position, to lift said rods and the attached bottles to a second level above said first level; and restricting means engageable with the upper ends of said bottles during lifting thereof from said first level to arrest motion of said bottles toward said second level while providing for lifting of said rods to said second level, to disengage said suction cups from the inner surfaces of the bottle bottoms to deposit the bottles on said second conveyor means; said first and second conveyor means extending at right angles to each other from said transverse station.

2. Bottle-feeding apparatus comprising, in combination, a first conveyor means arranged to transport a plurality of upright emptied bottles, arranged in a predetermined pattern, to a transfer station, a second conveyor means extending from said transfer station and arranged to have the bottles on said first conveyor means transferred thereto; a horizontally disposed restricting plate formed with a plurality of apertures therethrough equal in number to said bottles and arranged in said predetermined pattern; a plurality of vertically reciprocable rods at said transfer station equal in number to said bottles and to said apertures, and each extending through a respective aperture in said restricting plate; a plurality of suction cups each secured to the lower end of a respective rod; means mounting said rods for reciprocation, relative to said restricting plate, in unison to project them into bottles at said transfer station to engage said suction cups with the inner surfaces of the bottle bottoms and to lift said bottles to a first preselected level below said restricting plate; means mounting said restricting plate for movement parallel to the direction of movement of said second conveyor means; means for moving said mounting means and said restricting plate horizontally to transfer said rods between a first position, vertically aligned with said first conveyor means, and a second position, vertically aligned with said second conveyor means; and means operable, when said mounting means is in said second position, to lift said rod and the attached bottles to a second level above said first level; said restricting plate engaging the upper ends of said bottles during lifting thereof from said first level to arrest motion of said bottles towards said second level while providing for lifting of said rods to said second level, to disengage said suction cups from the inner surfaces of the bottle bottoms to deposit the bottles on said second conveyor means.

3. Bottle-feeding apparatus, as claimed in claim 2, in which said means mounting said restricting plates for slidable movement comprises a pair of rails each extending along a respective opposite side of said second conveyor means and each formed with a groove to receive said restricting plate.

4. Bottle-feeding apparatus comprising, in combination, a first conveyor means arranged to transport a plurality of upright emptied bottles, arranged in a predetermined pattern, to a transfer station, a second conveyor means extending from said transfer station and arranged to have the bottles on said first conveyor means transferred thereto; a horizontally disposed restricting plate formed with a plurality of apertures therethrough equal in number to said bottles and arranged in said predetermined pattern; a plurality of vertically reciprocable rods at said transfer station equal in number to said bottles and to said apertures, and each extending through a respective aperture in said restricting plate; a plurality of suction cups each secured to the lower end of a respective rod; means mounting said rod for reciprocation, relative to said restricting plate, in unison to project them into bottles at said transfer station to engage said suction cups with the inner surfaces of the bottle bottoms and to lift said bottles to a first preselected level below said restricting plate; a vertically extending shaft adjacent said transfer station; a horizontal arm fixedly secured at one end to said shaft; means connecting the other end of said arm to said mounting means in a manner to provide for horizontal sliding and pivotal relative movement between said mounting means and said arm while restricting vertical displacement of said arm relative to said mounting means; means mounting said restricting plate for horizontal displacement in a direction parallel to the direction of movement of said second conveyor means; and driving means operatively associated with said shaft and effective to displace the same axially and angularly; said driving means first displacing said shaft axially to lift said bottles to said first preselected level, and then displacing said shaft angularly to move said mounting means and said restricting plate horizontally to transfer said rods between a first position, vertically aligned with said first conveyor means, and a second position, vertically aligned with said second conveyor means; said driving means, when said mounting means and said restricting plate are in said second position, displacing said shaft axially to lift said rods and the attached bottles to a second level above said first level; said restricting plate engaging the upper ends of said bottles during lifting thereof from said first level to arrest motion of said bottles toward said second level while providing for lifting of said rods to said second level, to disengage said suction cups from the inner surfaces of the bottle bottoms to deposit the bottles on said second conveyor means.

5. Bottle-feeding apparatus, as claimed in claim 4, in which said rods are mounted for limited vertical displacement relative to said mounting means; means limiting movement of said rods in a downward direction; and spring means operatively disposed between said mounting means and said rods and biasing said rods to the limiting downward position.

6. Bottle-feeding apparatus, as claimed in claim 4, in which said first conveyor means comprises an endless conveyor and a box supported on said endless conveyor and constructed to support said bottles in said predetermined pattern; said box, with the bottles therein, being transported toward said transfer station by said endless conveyor; and an abutment engageable by said box as the latter is at the transfer station to arrest movement of said box.

References Cited by the Examiner
UNITED STATES PATENTS

| | | | |
|---|---|---|---|
| 1,610,363 | 12/1926 | Davis | 294—65 |
| 1,849,148 | 3/1932 | Monjonnier | 221—211 |
| 2,183,606 | 12/1939 | Day | 221—211 X |
| 2,442,250 | 5/1948 | Spain | 221—211 X |
| 2,466,693 | 4/1949 | Fischer. | |
| 2,578,912 | 12/1951 | Waters | 214—309 |
| 2,628,732 | 2/1953 | Griswold | 214—309 |
| 2,656,060 | 10/1953 | Fischer | 214—309 |
| 2,862,633 | 12/1958 | Stiles | 214—309 |
| 2,950,829 | 8/1960 | McBean. | |
| 3,031,906 | 5/1962 | Holman. | |

HUGO O. SCHULZ, *Primary Examiner.*